T. A. EDISON.
RECTIFIER.
APPLICATION FILED OCT. 7, 1910.
1,099,241.
Patented June 9, 1914.
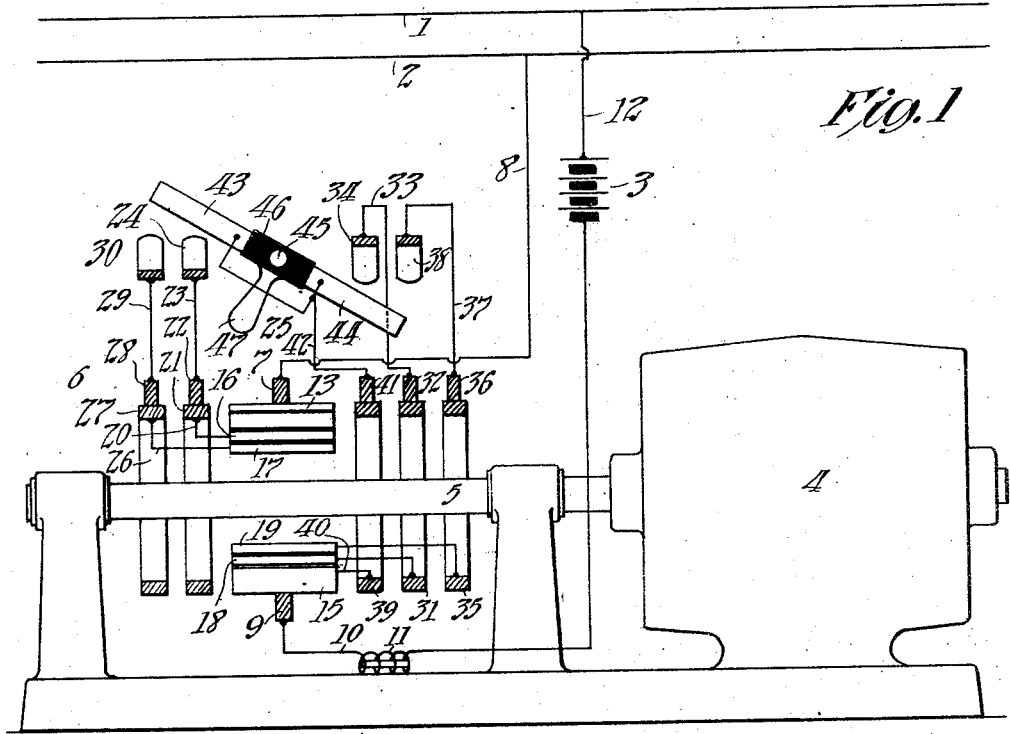
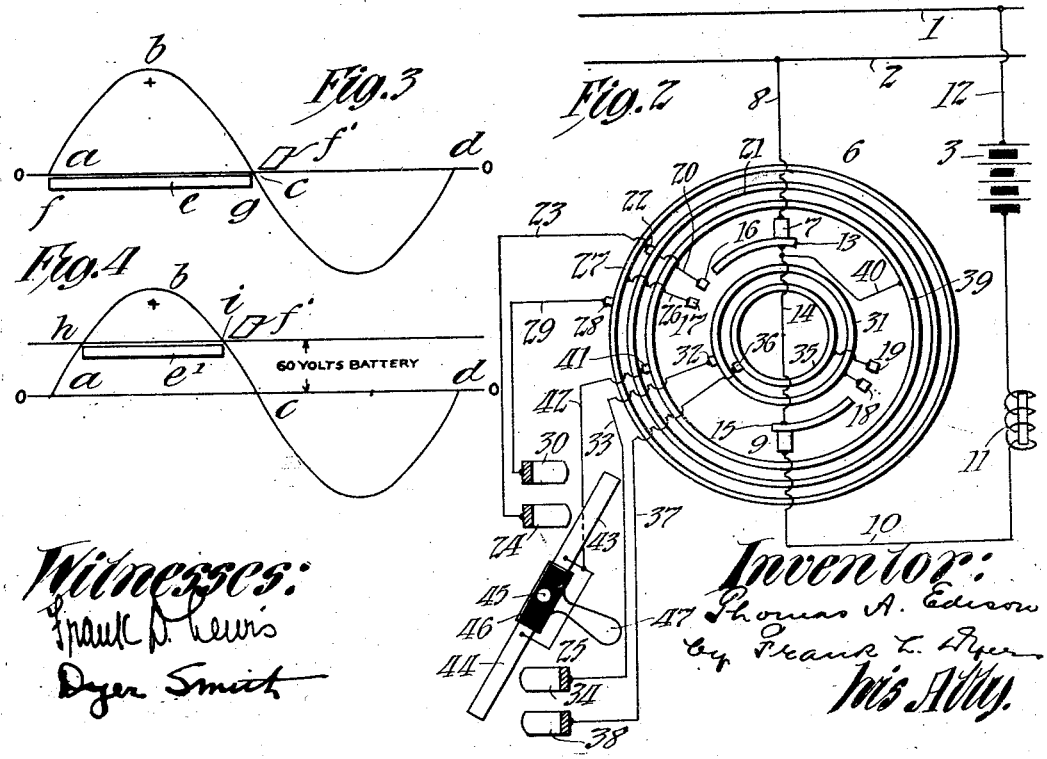
Witnesses:
Frank D. Lewis
Dyer Smith
Inventor:
Thomas A. Edison
by Frank L. Dyer
his Atty.

UNITED STATES PATENT OFFICE.

THOMAS A. EDISON, OF LLEWELLYN PARK, WEST ORANGE, NEW JERSEY.

RECTIFIER.

1,099,241.  Specification of Letters Patent.  Patented June 9, 1914.

Application filed October 7, 1910. Serial No. 585,758.

*To all whom it may concern:*

Be it known that I, THOMAS A. EDISON, a citizen of the United States, and a resident of Llewellyn Park, West Orange, Essex county, New Jersey, have invented certain new and useful Improvements in Rectifiers, of which the following is a description.

My invention relates to means for obtaining a unidirectional current from an alternating current circuit for charging storage batteries and for other purposes where such a current is desirable.

My rectifying apparatus is of the commutator type in which a rotating commutator is driven in synchronism with the alternating current to be rectified.

My object is to provide means for securing the best adjustment of the commutator for sparkless operation under widely varying conditions and when shifting of the contact brushes will not give the results desired.

My object is also to provide apparatus, in which sparking is minimized, for rectifying alternating currents where the rectified current is supplied to a receiving circuit which may be in any of a number of different electrical conditions.

My improved rectifier is particularly intended for use in charging storage batteries of various capacities and voltage.

To secure sparkless operation of a rectifying commutator used for supplying unidirectional current to a receiving circuit having a counter-electromotive force, it is evident that contact between the brushes and the active segment of the rectifying commutator should not be made until the voltage of the incoming charging wave equals at least the voltage of the receiving circuit, when there will be no difference of potential between the brushes and the active segment, with a consequent absence of sparking. The same conditions should obtain when the circuit is broken on the active segment. Consequently, if such a rectifier is to be used for supplying current to circuits of varying electrical conditions, means should be provided for varying the conductive arc of the segment at will and preferably while the device is in operation.

My invention comprises means for so lengthening the conductive arc of the active segment or segments of the commutator, and provides a method of rectifying by which the source of alternating current is only connected to the receiving circuit during the alternations of current of one polarity when the voltage of the charging wave has reached a value substantially equal to the counter-electromotive force of the receiving circuit, and disconnecting the alternating current source from the receiving circuit when the voltage of the charging wave has again fallen to the value of the counter-electromotive force of the receiving circuit. Also, preferably, my invention is applied to rectifying means in which the alternating current source is connected to the receiving circuit in series through a plurality of connected segments which simultaneously make contact with brushes connected to the alternating current source and the receiving circuit, the segments simultaneously breaking contact with the brushes each cycle of the charging wave to produce a plurality of breaks in series.

In order that my invention may be more clearly understood, attention is hereby directed to the accompanying drawings forming part of this specification and in which is illustrated apparatus embodying my invention.

In the drawings, Figure 1 is a partly diagrammatic representation of a rectifying system in which one form of my improved apparatus is employed. Fig. 2 is a diagrammatic view of the system with the parts of the apparatus so illustrated as to enable the circuits to be easily traced. Fig. 3 represents diagrammatically the circuit conditions when a rectifier of this type is supplying a non-inductive circuit with no counter-electromotive force. Fig. 4 illustrates similarly the circuit conditions when the same device is used in charging a battery of considerable voltage.

Referring to Fig. 3 of the drawings, the wave of alternating current $a$, $b$, $c$, $d$ passes from zero electromotive force at $a$ to its maximum value at $b$, whence it descends to zero value at $c$, the wave from $c$ to $d$ being of opposite polarity. Considering the case of a rectifier supplying a non-inductive circuit with no counter-electromotive force, it is evident that the active segment represented diagrammatically at $e$ and the brush contact $f'$ should remain in circuit from the moment when the voltage of the rectified current wave passes through zero value at the point $a$ until it again falls to zero at $c$, as shown, and in this case the length of segment $e$ should equal $f$—$g$. In the case of a rectifier charging a storage battery of, for instance, 60 volts potential, the wave a—b—c is of a voltage greater than 60 only between the points h and i, (Fig. 4) and consequently the length of the active segment e' should be only h—i.

One form of apparatus for varying the active length or conductive arc of the contacting segment to enable the same to be used under the two conditions specified, or on circuits of other varying electrical conditions is illustrated in Figs. 1 and 2, in which conductors 1 and 2 constitute the circuit carrying alternating current which is to be rectified for the purpose of charging the storage battery 3, or for any other desired purpose. 4 is a synchronous motor preferably of the induction type, mounted upon shaft 5. The motor is supplied with alternating current from the mains 1 and 2 by connections not shown. The commutator or rectifying switch illustrated generally at 6 is connected to rotate with motor 4, preferably being mounted on the shaft of the motor. The collecting brush 7 is connected to one side of the alternating current circuit by means of conductor 8 and the receiving brush 9 is connected by conductor 10 with one side of battery 3, the reactance or choke coil 11 preferably being interposed in the connection. The other side of battery 3 is connected to the other side of the alternating current circuit by conductor 12.

I accomplish the adjustment of the length of the conductive arc of the active segment of the commutator as follows:—13 represents a segment of minimum length for transmitting unidirectional current to a receiving circuit, or for charging a storage battery having the highest counter-electromotive force which is to be encountered. In the embodiment of my device illustrated, segment 13 is permanently connected by conductor 14 to an exactly similar segment 15 upon the opposite side of the commutator and separated from segment 13 by insulation. The lengths of segments 13 and 15 are so chosen that segment 13 makes contact with brush 7, and segment 15 makes contact with brush 9 at the moment when the charging wave of desired polarity reaches substantially the same potential as that of the battery 3 to be charged, current of one polarity flowing in series through conductor 8, brush 7, segment 13, conductor 14, segment 15, brush 9, conductor 10, reactance 11, to battery 3, and hence to the other side of the alternating current circuit until the voltage of the charging wave has fallen back to the voltage of the battery, when segments 13 and 15 will simultaneously break circuit with brushes 7 and 9. When a battery of lower voltage is to be charged, or the conditions of the receiving circuit are otherwise changed, so that the period of commutation relative to the length of the charging wave should be increased, additional segments such as 16 and 17 or one or more of the same may be added to segment 13, and segments as 18 and 19 or one or more of the same added electrically to segment 15, so that the active length of contacting arc of the segments is increased to meet the demand of the receiving circuit. The segments as 16, 17, 18 and 19 are insulated from each other and the rest of the apparatus. The extent of insulation or insulating space between segments 17 and 15 and between segments 19 and 13 respectively is sufficiently great to eliminate all the impulses of alternating current of the polarity which is not to be utilized. Segment 16 is connected by wire 20 to slip ring 21 which rotates with shaft 5. A brush 22 makes contact with ring 21 and is connected by wire 23 with contact 24 of hand switch 25. Segment 17 is connected by wire 26 with ring 27, brush 28 contacting ring 27 and being connected by wire 29 with contact 30 of switch 25. Segment 18 is connected as shown with ring 31 with which contacts brush 32 which is connected by wire 33 with contact 34 of switch 25. Segment 19 is connected to ring 35 with which contacts brush 36 which is connected by wire 37 with contact 38 of switch 25. Ring 39 is permanently connected by wire 40 with both segments 13 and 15 as shown. A brush 41 makes contact with this ring 39 and is connected by wire 42 with both blades 43 and 44 of switch 25. The switch is pivoted on stud 45 and is provided with insulation 46 separating blades 43 and 44. When the switch is rotated by means of handle 47, blades 43 and 44 first make contact with switch contacts 24 and 34, and upon a further rotation of the switch, blades 43 and 44 also complete contact with contacts 30 and 38 of the switch.

When the switch is left open, as shown, segments 16, 17, 18 and 19 are disconnected and the time of commutation is limited to that during which brushes 7 and 9 make contact with segments 13 and 15. When, however, the switch is closed upon contacts 24 and 34, segments 16 and 18 are connected electrically to segments 13 and 15 to increase the length of the period of commutation by the interval which is required for the passage of segments 16 and 18 beneath brushes 7 and 9 after segments 13 and 15 have passed under the brushes. The insulating space between the various segments of a series as 13, 16, is of a width less than that of the brushes, so that the circuit is not interrupted when the brush passes from, say section 13 to section 16, when the latter is connected to section 13 as described. When switch 25 is thrown to unite segments 16 and 18 to segments 13 and 15, current to charge the battery flows through brush 7, segment 13, conductor 14, segment 15 to brush 9, as shown, until segment 16 has moved under brush 7. Then the charging current flows through brush 7 to segment 16, through conductor 20, ring 21, brush 22, conductor 23, switch contact 24, switch blade 43, blade 44, contact 34, wire 33, brush 32, ring 31, segment 18, brush 9 and thence to the battery. When the switch 25 is thrown to also engage contacts 30 and 38, current flows from brush 7, when the same is in contact with segment 17, from the latter through conductor 26, ring 27, brush 28, conductor 29, contact 30, switch blade 43, switch blade 44, contact 38, conductor 37, brush 36, ring 35, segment 19, brush 9, and thence to the battery. The slip rings described are all mounted to rotate together with shaft 5 of motor 4, as shown.

It is to be noted that in the system described a pair of breaks in series are provided when the active segments break contact with brushes 7 and 9. It is obvious that my invention might be applied to a system in which the circuit is broken at only one point, the gist of my invention residing in the adding to or subtracting from the length of the active segment at will. Any number of additional segments for increasing the length of the main segment may be used. If desired, segments 15, 18 and 19 might be omitted, together with slip rings 31 and 35 and the accompanying connections, in which case a continuous slip ring would be substituted for segment 15 for forming a continuous contact with receiving brush 9, in which case the circuit would be broken at one point only, as desired, at the end of segments 13 or 16 or 17.

Having now described my invention, what I claim and desire to protect by Letters Patent is as follows:—

1. Means for rectifying alternating current, including a main conducting segment, and means for varying the conductive arc of said segment including an auxiliary segment and means for connecting or disconnecting said auxiliary segment to or from said main segment at will whereby the extent of the portion of the alternating current wave utilized may be controlled, substantially as described.

2. Means for rectifying alternating current, including a main conducting segment, and means for varying the conductive arc of said segment including an auxiliary segment and switch-controlled means for connecting or disconnecting said auxiliary segment to or from said main segment whereby the extent of the portion of the alternating current wave utilized may be controlled, substantially as described.

3. Means for rectifying alternating current, including a main conducting segment, an auxiliary conducting segment, a brush adapted to coöperate with said segments, means for causing said brush to make contact with said segments synchronously with the alternating current to be rectified and during impulses of one polarity only, and means for connecting or disconnecting said auxiliary segment to or from said main segment at will, substantially as described.

4. Means for rectifying alternating current, including a main conducting segment, an auxiliary conducting segment, a brush adapted to coöperate with said segments, means for causing said brush to make contact with said segments synchronously with the alternating current to be rectified and during impulses of one polarity only, and switch-controlled means for connecting or disconnecting said auxiliary segment to or from said main segment, substantially as described.

5. Means for rectifying alternating current, including a pair of oppositely disposed and electrically connected main conducting segments, auxiliary conducting segments, a pair of oppositely disposed brushes adapted to coöperate with said segments, means for causing said brushes to make contact with said segments synchronously with the alternating current to be rectified and during impulses of one polarity only, and means for connecting or disconnecting one or more of said auxiliary segments to or from each of said main segments at will, substantially as described.

6. Means for rectifying alternating current, including a pair of oppositely disposed and electrically connected main conducting segments, auxiliary conducting segments, a pair of oppositely disposed brushes adapted to coöperate with said segments, means for causing said brushes to make contact with said segments synchronously with the alternating current to be rectified and during impulses of one polarity only, and switch-controlled means for connecting or disconnecting one or more of said auxiliary segments to or from each of said main segments, substantially as described.

7. In an alternating current rectifier, a pair of oppositely disposed and electrically connected main conducting segments, a pair of oppositely disposed auxiliary conducting segments, a pair of oppositely disposed brushes adapted to coöperate with said segments, said segments being rotatably mounted and movable relatively to said brushes, and means for connecting or disconnecting one of said auxiliary segments to or from each of said main segments at will, substantially as described.

8. In an alternating current rectifier, a pair of oppositely disposed and electrically connected main conducting segments, a pair of oppositely disposed auxiliary conducting segments, a pair of oppositely disposed brushes adapted to coöperate with said segments, said segments being rotatably mounted and movable relatively to said brushes, and switch-controlled means for connecting or disconnecting one of said auxiliary segments simultaneously to or from each of said main segments, substantially as described.

9. In rectifiers, in combination, a commutator having a pair of conducting segments oppositely disposed and connected together, auxiliary segments in line with each of said segments but insulated therefrom, and connections and a switch for connecting said auxiliary segments each to its adjacent segment, substantially as described.

10. In rectifiers, in combination, a commutator having a conducting segment, a series of additional segments in line therewith but insulated therefrom, and a switch and connections for connecting electrically any desired number of said additional segments to said first segment, at will, substantially as described.

11. Means for rectifying alternating current, including conducting sections, each of said sections comprising segments, and means for varying the conductive arcs of said sections by rendering one or more segments of each section operative or inoperative to conduct current, substantially as described.

12. An alternating current rectifying device comprising a pair of connected conducting main segments, auxiliary segments adjacent thereto, brushes adapted to coöperate with all of said segments, and means for varying the conductive arcs of the main segments by electrically connecting together auxiliary segments, substantially as described.

This specification signed and witnessed this 4th day of October 1910.

THOS. A. EDISON.

Witnesses:
DYER SMITH,
ANNA R. KLEHM.

Copies of this patent may be obtained for five cents each, by addressing the "Commissioner of Patents, Washington, D. C."